2,992,922
METHODS FOR PREPARING BAKED GOODS
Charles G. Ferrari, Evanston, and Kazuo Higashiuchi, Chicago, Ill., assignors to J. R. Short Milling Company, Chicago, Ill., a corporation of Illinois
No Drawing. Filed June 23, 1959, Ser. No. 822,172
8 Claims. (Cl. 99—91)

This invention relates to methods for preparing yeast-leavened baked goods and to compositions for use therein. The invention has particular utility in the preparation of white bread and rolls.

In the baking art, it has long been common practice to employ as additives in the dough mixture various agents intended to provide specific improvements in the finished product. Thus, calcium peroxide has been employed to provide an increase in water absorption while maintaining satisfactory dough properties and avoiding deleterious volume changes in the finished product, and the bromates have been employed to provide a dough-maturing action evidenced by improvement in grain, texture and volume of the finished bread or other baked goods. Considering these agents which heretofore have proved suitable for commercial use, the action of each agent is more or less specific, and the baker has been forced to use more than one additive when a variety of improving actions is desired. Thus, for instance, if both a dough-maturing effect and an increase in water absorption are desired, it has heretofore been necessary to add to the dough mixture both a bromate or like maturing agent and calcium peroxide. Further, save for the legume enzyme materials, no commercially satisfactory additive has been available which is capable of accomplishing dough bleaching or otherwise improving crumb color of the baked goods by action in the dough or during baking.

The present invention provides an improved method for preparing baked goods employing, as additives in the dough mixture, certain novel oxidatively active compositions derived from methyl ethyl ketone and hydrogen peroxide. All embodiments of the invention provide improved dough properties and allow increased water absorption without deleterious volume changes in the finished product. The invention also provides a marked dough-maturing effect, evidenced by improved volume and internal characteristics, particularly the grain and texture, of the finished baked goods. Additionally, the method of the present invention accomplishes an improvement in the crumb color of the finished bread or the like.

As has been indicated, the present invention is based upon the use of certain oxidatively active reaction mixtures. In this specification, the term "oxidatively active" is employed to designate the ability of the composition or reaction mixture to at least mature flour when blended therewith in proportions providing a hydrogen peroxide equivalent on the order of 0.001% of the weight of the flour.

The oxidatively active compositions employed in the invention comprise peroxidic products and product mixtures derived by reacting methyl ethyl ketone and hydrogen peroxide. The methyl ethyl ketone and aqueous hydrogen peroxide are combined in proportions providing in the initial reaction mixture from .5 to 2.5 moles of hydrogen peroxide for each mole of methyl ethyl ketone and the resulting initially homogeneous reaction mixture is maintained below 100° C. until, upon standing at normal temperature, the reaction mixture separates into phases of different specific gravity, the phase of lower specific gravity predominantly comprising methyl ethyl ketone peroxides and free methyl ethyl ketone. Advantageously, an acid catalyst is employed in proportions up to 5% by weight of the reaction mixture, to accelerate formation of the oxidatively active reaction product. Depending upon the relative proportions of methyl ethyl ketone and hydrogen peroxide, the amount of water introduced into the reaction mixture with the hydrogen peroxide or otherwise, the temperature at which the reaction mixture is maintained, and whether or not the reaction mixture is agitated, the reaction time may be selected within the range of from 1 minute to 48 hours.

Though the yield of methyl ethyl ketone peroxides is sufficiently high to allow use of the entire reaction product mixture as a novel oxidatively active composition for bleaching and/or maturing flour, the reaction product mixtures produced in the foregoing manner are admirably suited to concentration in various ways. First, the phase of lower specific gravity, amounting to as much as 80% by volume of the total reaction product mixture, is easily recoverable from the higher specific gravity material, only a small proportion of the oxidatively active products remaining in the higher specific gravity material. Next, both the free water and the free methyl ethyl ketone present in the phase of lower specific gravity can be removed easily without substantial loss of the desired peroxidic reaction products. Also, a highly active product consisting essentially of a single acyclic methyl ethyl ketone peroxide is obtainable from the phase of lower specific gravity by extraction with a low boiling hydrocarbon solvent such as hexane or pentane.

Advantageously, the oxidatively active materials produced from methyl ethyl ketone and hydrogen peroxide in the manner above described are combined with a carrier material. Where the carrier material is a finely particulate solid, the liquid reaction product mixture can be combined therewith in such proportions that the liquid amounts to as much as 25% by weight of the combined liquid and carrier. The entire reaction product mixture can be combined with the carrier, the step of separating the phase of lower specific gravity being omitted. A more highly active composition, having greater utility, is obtainable, however, by recovering the phase of lower specific gravity from the liquid reaction product mixture, then at least substantially reducing the free water content of the recovered phase, and then combining the concentrated oxidatively active liquid with the carrier material. It is also advantageous to obtain a hexane or like extract of the phase of lower specific gravity and combine such extract with the carrier material, with or without removal of the hexane or other extraction medium.

As has been pointed out, the phase of lower specific gravity resulting from reaction of methyl ethyl ketone and hydrogen peroxide in the manner described contains, in addition to methyl ethyl ketone peroxide, a substantial proportion of unreacted methyl ethyl ketone. Thus, about 20–40% by weight of the phase of lower specific gravity may be free methyl ethyl ketone. Advantageously, this free methyl ethyl ketone is left in the liquid material until after the same has been combined with the carrier material, and the free ketone is then at least largely removed by volatilization. Thus, employing a particulate solid carrier material, the free ketone is removed by aerating the product, with or without the aid of reduced pressure, at a temperature not exceeding 125° C. Assuming that a relatively large proportion of the oxidatively active liquid reaction product mixture is combined with a solid carrier material such as a cereal flour, especially good results are obtained by aerating with the aid of vacuum at a temperature of 30–50° C. In general, the temperatures employed during removal of the free methyl ethyl ketone can be increased if (1) the relative proportion of methyl ethyl ketone peroxides introduced to the carrier is small or (2) the product introduced to the carrier contains only small proportions of materials other than acyclic methyl ethyl ketone peroxides and free ketone.

While the relative proportion of hydrogen peroxide in the initial reaction mixture can be selected from the broader range of .5 to 2.5 moles per mole of methyl ethyl ketone, superior results are obtained when the hydrogen peroxide ranges from 1 to 1.5 moles per mole of ketone. Such proportions provide good reaction rates and greater yields of methyl ethyl ketone peroxides. Within the limits specified, increasing the relative proportion of methyl ethyl ketone will increase the volume of the lower specific gravity material, also increasing the proportion of free ketone therein, while an increase in the relative proportion of hydrogen peroxide will increase the volume of the higher specific gravity product, also increasing the proportion of free hydrogen peroxide therein.

The rate of reaction and the yield of peroxides also depends upon the concentration of hydrogen peroxide in the initial reaction mixture. In this connection, the hydrogen peroxide is preferably employed in the form of an aqueous solution containing at least 25% by volume hydrogen peroxide, and considerable water is thus introduced into the reaction mixture. While the presence of water is not essential to the reaction, it is required in order that the reaction product mixture will separate into phases of lower and higher specific gravity, the phase of higher specific gravity retaining those compounds which are more soluble in water. In order to obtain the advantages of phase separation and still maintain good reaction rates and yields, the proportion of water in the initial reaction mixture, whether added with the hydrogen peroxide or otherwise, is kept in the range of 10–50% by volume, based on the total reaction mixture. Thus, an aqueous hydrogen peroxide solution should not be used which is so dilute as to provide, for the particular proportion of hydrogen peroxide chosen, an amount of water in excess of 50% of the volume of the initial reaction mixture. On the other hand, if an amount of water less than 10% of the volume of the initial reaction mixture is provided by addition of the hydrogen peroxide solution, additional water should be added to provide the minimum amount necessary for phase separation.

The reaction is rather strongly exothermic initially. However, if the reaction mixture is cooled for an initial period sufficient to remove the exothermic heat, cooling can then be terminated and the reaction mixture will remain cool for the balance of the reaction period.

Best yields of methyl ethyl ketone peroxides are obtained in the shortest reaction time when the reaction mixture is maintained at a temperature within the range of 15–70° C. Within such temperature range, and with the proportion of hydrogen peroxide being from 1 to 1.5 moles per mole of methyl ethyl ketone, the other process variables being controlled as hereinbefore discussed, the phase of lower specific gravity will amount to from 35–80% by volume of the reaction product mixture, as much as 80% by weight of such lower specific gravity phase being methyl ethyl ketone peroxides, the predominant portion of the organic peroxide content being an individual acyclic methyl ethyl ketone peroxide as yet not completely characterized.

While the reaction proceeds at temperatures up to 100° C., the yield of the desired peroxides obtained in a given reaction time decreases as the temperature is raised above about 80° C. The reaction rate is also decreased when the temperature of the reaction mixture is decreased below 15° C. but, by extending the reaction time, good yields can be obtained at temperatures on the order of 10° C. and lower.

Excellent results are obtained by combining the reactants at room temperature, cooling the reaction mixture initially to absorb exothermic heat, and then allowing the reaction mixture to continue for the selected time period at room temperature.

When the reaction is carried out at elevated temperatures, phase separation is accomplished by cooling the liquid product to about room temperature.

While other acid catalysts can be employed, best results have been obtained with the mineral acids in amounts up to about 5% by weight of the reaction mixture. Among the mineral acids, the ability of the acid to catalyze the reaction varies between the individual acids. Thus, while excellent reaction rates and yields are attained by using 0.04–1% by weight of hydrochloric or sulfuric acid, the equivalent results are achieved with 0.4–4% of phosphoric acid. Practical reaction times on the order of 1 minute are provided when 1% of hydrochloric or sulfuric acid is employed and when 4% of phosphoric acid is employed. Without catalyst, the reaction time can be extended to 48 hours.

The compositions of the invention can be incorporated in the dough for the baked goods in any suitable fashion. Thus, the reaction product mixtures derived from methyl ethyl ketone and hydrogen peroxide can be added in liquid form to the dough. Advantageously, the present method employs carrier-supported compositions, with the carrier material being a finely particulate solid, so that the compositions of the invention can be handled in a manner with which the baker is familiar. Such carrier-supported compositions can be incorporated in the flour employed or can be added at any stage during the dough preparation at which it is convenient to add solid materials. Thus, in a "straight dough" procedure, the carrier-supported composition can be added in the initial mixture and, in a "sponge dough" procedure, it is advantageous to add the carrier-supported composition in the dough mixing stage.

As solid particulate carrier materials, the food starches, especially corn starch, heat-modified starches, dextrines, wheat flour, wheat gluten, corn flour, vegetable proteins such as soy protein, and edible inorganic materials, such as the inorganic phosphates and calcium sulfate are suitable.

Like all practical bread improvers, the compositions employed in the present invention are used in relatively small proportions, such as to provide in the dough a hydrogen peroxide equivalent on the order of from a few thousandths to a few hundredths percent of the weight of the flour used in making the dough.

The following examples are illustrative of the invention:

EXAMPLE 1

An initially homogeneous liquid reaction mixture was prepared by blending 50 ml. methyl ethyl ketone, 50 ml. aqueous hydrogen peroxide (35% $H_2O_2$ by volume) and .5 ml. aqueous sulfuric acid (10% $H_2SO_4$ by volume). The reaction mixture was refluxed under a condenser over a boiling water bath for 1 hour and was then rapidly cooled to room temperature, promptly separating into distinct upper and lower phases. The upper phase, having a volume of 46 ml., was recovered with a separatory funnel and treated with anhydrous sodium sulfate for removal of dissolved water.

Of the recovered, now substantially water-free liquid product, 40 ml. was blended with 100 g. dry, food grade corn starch and the resulting blend then extended with an additional 400 g. of the same starch. To provide a final composition having a hydrogen peroxide equivalent content of 0.36% by weight, 300 g. of the starch-recovered liquid mixture was further blended in a batch mixer with 700 g. of the same corn starch and the 1,000 g. of final product was then heated, with occasional stirring, for 40 min. over a boiling water bath.

The resulting composition was used in making white bread, using a commercially available bleached bread wheat flour and a standard sponge-dough procedure with the following formula:

| Sponge | Ingredient | Dough |
|---|---|---|
| 450 g. | Flour | 250 g. |
| 300 cc. | Water | See below. |
| 17.5 g. | Yeast | |
| 2.5 g. | Yeast food | |
| | Milk solids | 21 g. |
| | Salt | 14 g. |
| | Sugar | 35 g. |
| | Lard | 21 g. |

The novel oxidatively active composition of this example was employed in the dough mixing stage. Three doughs were prepared, dough A being used as control and including 130 cc. water in the dough mixing stage, dough B being prepared with the novel oxidatively active composition of this example added in the dough mixing stage at the rate of 1% of the total flour weight and with 130 cc. water in the dough mixing stage, and dough C with the same quantities of the oxidatively active composition of this example but with 150 cc. of water in the dough mixing stage. Thus, doughs A and B employed the same amount of water while dough C was prepared with an additional 3% of water. The bread was baked in conventional fashion with the conditions being identical for all three doughs.

Dough B was observed to be definitely drier than control dough A and had generally improved handling characteristics. Even with the additional 3% water, dough C was observed to have improved handling properties and to be only slightly soft. Both doughs B and C, on rounding, had better body than the control dough. In the finished bread, the baked loaves from doughs A, B and C had volumes of 2500, 2525 and 2550 cc., respectively. The bread from dough B showed definitely superior internal characteristics, as compared to control. The bread from dough C, despite the 3% additional water in the dough mixing stage, was fully equivalent to the control insofar as internal characteristics were concerned.

EXAMPLE 2

An initially homogeneous liquid reaction mixture was prepared by blending 50 ml. aqueous hydrogen peroxide solution (35% $H_2O_2$ by volume), 50 ml. methyl ethyl ketone and 1 ml. of aqueous sulfuric acid (10% $H_2SO_4$ by volume). The reaction mixture was refluxed over a water bath, employing a suitable condenser, for 30 min. and was then allowed to stand until the liquid separated into distinct upper and lower layers. The upper layer, amounting to 49 ml., was recovered by means of a separatory funnel and the dissolved water was removed by treatment with anhydrous sodium sulfate.

Of the recovered liquid, 43 ml. was blended with 500 g. of dry, food grade corn starch, and the resulting blend was heated for 40 min. at 100° C. for removal of volatiles. One hundred g. of the resulting carrier-supported composition was extended with an additional 100 g. of the same corn starch, the composition then being heated for 30 min. at 100° C. The final carrier-supported composition, hereinafter referred to as composition 1, was found to have a hydrogen peroxide equivalent content of 0.68% by weight.

An initially homogeneous liquid reaction mixture was prepared by blending 50 ml. aqueous hydrogen peroxide (35% $H_2O_2$ by volume), 50 ml. methyl ethyl ketone and 1 ml. aqueous hydrochloric acid (1 part conc. HCl to 1 part water). The reaction mixture was maintained substantially at room temperature for 1.5 hours, being agitated continuously throughout such period by means of a rotating magnetic stirrer. The mixture was then allowed to stand without stirring until it separated into two distinct upper and lower phases and the upper phase, amounting to 45.5 ml., was recovered and dried with anhydrous sodium sulfate. A carrier-supported composition was prepared by blending 15 ml. of the recovered liquid with 300 g. dry, food grade corn starch and heating the resulting mixture at 100° C., with intermittent stirring, for 75 min. The final product, hereinafter referred to as composition 2, was found to have a hydrogen peroxide equivalent content of 0.78% by weight.

Compositions 1 and 2 of this example were employed in the preparation of white bread from a commercially available unbleached bread wheat flour, using a standard straight dough procedure, with the following formula.

| Ingredient: | Proportion |
|---|---|
| Flour | g ---- 700 |
| Yeast | g ---- 21 |
| Milk solids | percent -- 3 |
| Salt | do ---- 2 |
| Sugar | do ---- 8 |
| Lard | do ---- 3 |

Four separate doughs were prepared under identical conditions, dough A being employed as control and including 400 cc. water and no special additive. Dough B was prepared with 410 cc. water and ¼% by weight, based on the flour, of composition 1 of this example. Dough C included 410 cc. water and ¼% by weight, based on the flour, of composition 2 of this example. Dough D was prepared with 410 cc. water and ¼% by weight, based on the flour, of a commercially available calcium peroxide bread improver composition having a $CaO_2$ content of 0.68% by weight.

During fermentation, it was noted that the control dough A was flat, while dough C, B and D were all bold. Doughs B, C and D, despite the additional 10 cc. of water, all had excellent dough handling properties, doughs B and C being at least fully equivalent in this respect to dough D.

Bread was baked from all four doughs and it was found that the bread from doughs B, C and D exhibited no adverse effects insofar as volume and external characteristics were concerned, as a result of inclusion of the special additives. Despite the additional water employed in doughs B, C and D, the bread from these doughs showed improved internal characteristics, as compared to the bread from the control dough. As compared to the bread from the control dough and dough D, the bread from doughs B and C showed observable color improvement.

EXAMPLE 3

White bread was prepared by a standard sponge dough procedure from a commercially available bleached bread wheat flour, using the following formula:

| Sponge | Ingredient | Dough |
|---|---|---|
| 450 g. | Flour | 250 g. |
| 275 cc. | Water | See below. |
| 17.5 g. | Yeast | |
| 2.5 g. | Yeast food | |
| | Milk solids | 21 g. |
| | Salt | 14 g. |
| | Sugar | 35 g. |
| | Lard | 21 g. |

Dough A, used as control, was prepared without special additives, using 130 cc. water in the dough mixing stage. Dough B was identical with dough A but included, in the dough mixing stage, composition 2 of Example 2 in an amount equal to ¼% of the total flour weight. Dough C was prepared identically with dough B, except that 150 cc. of water was used in the dough mixing stage.

During the intermediate proofing interval, doughs B and C remained bold as compared to control dough A. Doughs B and C tended to become firmer immediately after mixing, while dough A remained slack and spread out.

The three doughs were baked into bread under identical conditions, the loaf volumes being 2600, 2650 and 2600, respectively. Though the bread from dough A had a very even grain and silky texture, the bread from dough B was definitely superior as to internal characteristics, having a closer, finer grain and a brighter and lighter crumb color. The bread from dough C, in which an additional 3% water was employed in the dough mixing stage, was entirely satisfactory, insofar as internal characteristics were concerned, even in view of the increased amount of water, but did not exhibit the same improvement in grain and texture noted in the bread from dough B.

*Analytical procedures*

Total peroxide content of the reaction products prepared as hereinbefore described can be determined by (1) potassium iodide-thiosulfate titration, using aqueous sulfuric acid (1 part $H_2SO_4$ to 9 parts of water by volume) or (2) modified Wheeler titration, omitting chloroform. The results are expressed as the hydrogen peroxide equivalent value.

Free hydrogen peroxide is determined as follows:

*Step 1.*—A 0.05 g. sample of the material to be analyzed is combined with 25 ml. water and 1 mg. catalase and allowed to react for 30 min. *Step 2.*—Twenty-five ml. aqueous sulfuric acid (1 part conc. $H_2SO_4$ to 4 parts water by volume) is added, followed by 1 ml. saturated potassium iodide solution. *Step 3.*—The solution is titrated with standard thiosulfate to give the total organic peroxide content, free hydrogen peroxide having been destroyed by the catalase in step 1. *Step 4.*—Subtract the total organic peroxide content, determined in step 3, from the total peroxide content, the difference being free hydrogen peroxide.

Free methyl ethyl ketone is measured as follows:

*Step 1.*—Combine 200 ml. of .3% fresh hydroxylamine hydrochloride and a .2 g. sample of the material to be analyzed and allow to stand for 3 min. *Step 2.*—Titrate with standard .1 N sodium hydroxide until pH is brought to the original pH of the hydroxylamine hydrochloride solution. *Step 3.*—Compute percent free methyl ethyl ketone as follows:

$$\frac{(\text{Titration value})(0.00777)(100)}{\text{Sample weight}} = \text{percent methyl ethyl ketone}$$

*Characterization of methyl ethyl ketone peroxide constituting predominant proportion of reaction product*

While not as yet identified with complete accuracy, the acyclic methyl ethyl ketone peroxide which constitutes the predominant proportion of the product resulting from reacting methyl ethyl ketone and hydrogen peroxide in accordance with the method hereinbefore described appears to be bis-(1,1'-hydroperoxy 1,1'-ethyl) diethyl peroxide, having the formula

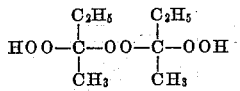

The compound titrates in the same fashion as bis-(1,1'-hydroperoxy 1,1'-methyl) diethyl peroxide, the corresponding compound derived from acetone.

Active oxygen was determined for the methyl ethyl ketone peroxide in question in the following manner: The phase of lower specific gravity produced in accordance with Example 1 was recovered and extracted with hexane, the solvent and free ketone then being removed from the extract by fractional distillation under vacuum. The residue from the distillation step was then dissolved in cold hexane, dried with anhydrous sodium sulfate and cooled to −70° C. on a Dry Ice-ethyl alcohol bath, causing the peroxide to be thrown down as a heavy, oily liquid. The hexane was decanted, the purified product recovered, and the procedure repeated. The active oxygen content of the finally recovered, purified product was determined by titration with .1 N thiosulfate and computed in accordance with the following formula:

$$\frac{(\text{Titration value})(.0008)(100)}{\text{Sample weight}} = \text{Percent active } O_2 \text{ by weight}$$

The active oxygen was found to be 22.4% by weight, .2% less than the theoretical active oxygen content of bis-(1,1'-hydroperoxy 1,1'-ethyl) diethyl peroxide.

In similar determinations, the material thrown down from the cold hexane solution has varied from a solid to a heavy liquid at room temperature, apparently due to the presence of varying, small amounts of impurities.

Both the active oxygen determination and the fact that the corresponding cyclic compounds are not titratable by the thiosulfate procedure indicate that the product is the acyclic dimeric peroxide of methyl ethyl ketone.

We claim:

1. The method for preparing yeast-leavened baked goods comprising preparing a dough by combining with flour and other dough-forming ingredients an oxidatively active composition having a peroxide content at least predominantly constituted by acylic peroxidic reaction products of methyl ethyl ketone and hydrogen peroxide, said reaction products being titratable by thiosulfate titration and baking the dough, the proportion of said oxidatively active composition employed providing in the dough a hydrogen peroxide equivalent value, based on the weight of the flour, of at least a few thousandths of a percent.

2. The method for preparing yeast-leavened baked goods comprising preparing a dough by combining with flour and other dough-forming ingredients an oxidatively active composition containing as its major oxidatively active component a peroxidic compound produced by reacting methyl ethyl ketone and hydrogen peroxide at a temperature below 100° C., and baking the dough, the amount of said oxidatively active composition employed providing in the dough a hydrogen peroxide equivalent value, based on the flour weight, of at least a few thousandths of a percent.

3. The method for preparing yeast-leavened baked goods comprising preparing a dough by combining with flour and other dough-forming ingredients an oxidatively active liquid composition produced by reacting, at a temperature below 100° C. and for a period of from 1 minute to 48 hours, a reaction mixture containing methyl ethyl ketone and hydrogen peroxide, in which reaction mixture the proportion of hydrogen peroxide is from .5–2.5 moles per mole of methyl ethyl ketone, and baking the dough, the amount of said oxidatively active composition employed providing in the dough a hydrogen peroxide equivalent value, based on the flour weight, of at least a few thousandths of a percent.

4. The method of claim 3 wherein said liquid composition is combined with a finely particulate, solid, edible carrier material.

5. The method for preparing yeast-leavened baked goods comprising preparing a dough by combining with flour and other dough-forming ingredients an oxidatively active liquid composition obtained by the steps of (1) combining methyl ethyl ketone, hydrogen peroxide, water and 0–5% of an acid catalyst to form a liquid reaction mixture containing .5–2.5 moles hydrogen peroxide per mole methyl ethyl ketone and wherein the water content is 10–50% by volume, (2) maintaining said reaction mixture below 100° C. for from 1 minute to 48 hours, (3) allowing the resulting reaction product mixture to separate into phases of lower and higher specific gravity, (4) recovering said phase of lower specific gravity, and (5) at least materially reducing the free methyl ethyl ketone content of the material so recovered to provide an oxidatively active liquid product predominantly comprising the acylic peroxidic reaction product of methyl ethyl ketone and hydrogen peroxide, and baking the dough so formed, the amount of said oxidatively active composition employed providing in the dough a hydrogen peroxide equivalent value, based on the flour weight of at least a few thousandths of a percent.

6. The method of claim 5 wherein said liquid composition is in combination with a finely particulate, solid, edible carrier material.

7. The method for preparing yeast-leavened baked goods comprising preparing a dough by combining with flour and other dough-forming ingredients a small but effective proportion of an acylic methyl ethyl ketone peroxide prepared by (1) combining methyl ethyl ketone, hydrogen peroxide, water and 0–5% of an acid catalyst to provide an initially homogeneous liquid reaction mixture containing 10–50% by volume water and .5–2.5 moles of hydrogen peroxide per mole of methyl ethyl ketone, (2) maintaining said reaction mixture below 100° C. for from 1 minute to 48 hours and thereby causing the methyl ethyl ketone and hydrogen peroxide to react to form an acylic methyl ethyl ketone peroxide, (3) allowing the resulting liquid reaction product mixture to separate into a phase of lower specific gravity, containing said methyl ethyl ketone peroxide in solution, and a phase of higher specific gravity, (4) recovering said phase of lower specific gravity, and (5) extracting said methyl ethyl ketone peroxide from the phase so recovered; and baking the dough, the proportion of said acylic methyl ethyl ketone peroxide employed providing in the dough a hydrogen peroxide equivalent value, based on the flour weight, of at least a few thousandths of a percent.

8. The method for preparing yeast-leavened baked goods comprising making a dough by combining with flour and other dough-forming ingredients a small but effective proportion of an acylic hydroperoxidic reaction product formed by reaction of methyl ethyl ketone and hydrogen peroxide, said reaction product being titratable by thiosulfate titration and having an active oxygen content of about 22.4% by weight, the proportion of said reaction product employed providing a hydrogen peroxide equivalent value, based on the weight of the flour, of at least a few thousandths of a percent, and baking the dough so made.

References Cited in the file of this patent

UNITED STATES PATENTS

| | | |
|---|---|---|
| 1,483,546 | Gelissen | Feb. 12, 1924 |
| 1,539,701 | Sutherland | May 26, 1925 |
| 1,866,412 | Van der Lee | July 5, 1932 |
| 2,903,361 | Marks et al. | Sept. 8, 1959 |

FOREIGN PATENTS

| | | |
|---|---|---|
| 444,544 | Great Britain | Mar. 23, 1936 |